United States Patent
Bente et al.

(10) Patent No.: US 7,128,089 B2
(45) Date of Patent: Oct. 31, 2006

(54) FLOW CONTROL PROVIDING STABLE FLUID FLOW

(75) Inventors: H. Bryan Bente, Landenberg, PA (US); Robert Clark Henderson, Avondale, PA (US)

(73) Assignee: Agilent Technologies, Inc., Santa Clara, CA (US)

( * ) Notice: Subject to any disclaimer, the term of this patent is extended or adjusted under 35 U.S.C. 154(b) by 223 days.

(21) Appl. No.: 10/845,947

(22) Filed: May 14, 2004

(65) Prior Publication Data

US 2005/0253103 A1  Nov. 17, 2005

(51) Int. Cl.
*F16K 15/00* (2006.01)

(52) U.S. Cl. .......................... 137/512.15; 137/601.18; 251/83; 251/334

(58) Field of Classification Search .................. 251/83, 251/82, 129.19, 129.15, 334; 137/512.15, 137/601.18

See application file for complete search history.

(56) References Cited

U.S. PATENT DOCUMENTS

| | | | |
|---|---|---|---|
| 3,945,390 A | * | 3/1976 | Huber .......................... 251/334 |
| 4,350,176 A | * | 9/1982 | Lace ........................... 251/334 |
| 5,232,196 A | | 8/1993 | Hutchings et al. |
| 6,367,766 B1 | * | 4/2002 | Briant et al. ........... 251/129.08 |
| 6,695,006 B1 | | 2/2004 | Neagoe et al. |
| 2003/0015243 A1 | * | 1/2003 | Neagoe et al. ......... 137/625.33 |

* cited by examiner

Primary Examiner—John Bastianelli

(57) ABSTRACT

An electro-mechanical variable fluid flow restrictor includes a support having a passage and a seal surface, a deformable seal that is engageable with the seal surface, and a bias member for exerting an electronically controlled variable bias against the deformable seal. The seal surface includes channels formed in its surface that extend beneath the deformable seal. The bias member can exert a bias sufficient to cause the deformable seal to fill the channels, preventing fluid flow through the channels. When the bias member decreases the bias against the deformable seal, the deformable seal gradually moves out of the channels, allowing fluid flow through the channels, and through the passage in a flow control. The deformable seal does not need to separate from the seal surface to allow fluid flow. Instead, fluid flows through the small, controlled flow areas created when the deformable seal withdraws from the channels.

20 Claims, 6 Drawing Sheets

FLOW CONTROL PROVIDING STABLE FLUID FLOW

BACKGROUND

Many applications, such as gas chromatography applications, require a controlled source of pressure and/or flow of a fluid in order to obtain accurate and repeatable measurements. Pressure regulators are commonly used to maintain the pressure of a fluid in a test device at a constant target pressure to ensure accurate and reproducible measurements. Flow controllers, also referred to as mass flow controllers, are used to control the flow of a fluid, such as a gas or a liquid, through a test device, such as a gas chromatograph.

A typical pressure regulator includes a chamber having a regulated pressure. The regulated chamber is in fluid communication with the test device so that the pressure in the test device is regulated along with the pressure in the chamber. The pressure regulator also includes a source of pressurized gas and a valve for releasing the pressurized gas into the chamber. The source of pressurized gas is used to raise the pressure in the chamber when the pressure falls below the target pressure. A mass flow controller uses a similar valve to control and regulate the flow through the valve using, for example, a flow measurement as feedback to control the flow through the valve.

Some valves have a cylindrical seal and some valves have an o-ring seal that controls the flow of gas from the source to the chamber. Such valves can also be referred to as a variable fluid flow restrictor. The seal is normally biased against a valve seat when the chamber is above the target pressure. When the pressure in the chamber falls below the target pressure, the bias against the seal is released, and the seal separates from the valve seat, allowing the pressurized gas to flow into the chamber.

A disadvantage to these types of valves is that when the seal separates from the valve seat, it does not maintain a stable position. Instead, sections of the seal may actually oscillate between separation and contact with the valve seat. The material of the valve seal may also stick to the surface of the valve seat, a condition referred to as "stiction." Stiction between the valve seal and the surface of the valve seat may cause a hysteresis effect when the valve attempts to open, sticks, and then opens further than desired. Once the valve opens further than desired, the valve may exceed its setpoint and then immediately close to compensate, thus producing an undesirable hysteresis effect. Such hystersis makes the valve difficult to control. Regardless of the manner caused, oscillation of the seal creates disturbances in the flow of pressurized gas, which causes unstable gas flow through the valve and pressure anomalies in the chamber receiving the pressurized gas. Because the test device is in fluid communication with the chamber, the pressure within the test device fluctuates, which negatively affects measurements taken in the test device.

Accordingly, a need exists for a flow control capable of providing stable fluid flow.

SUMMARY OF INVENTION

According to one embodiment, an electromechanical variable fluid flow restrictor includes a support having a passage and a seal surface, a deformable seal that is engageable with the seal surface, and a bias member for exerting an electronically controlled variable bias against the deformable seal. The seal surface includes channels formed in its surface that extend beneath the deformable seal. The bias member can exert a bias sufficient to cause the deformable seal to fill the channels, preventing flow through the channels. When the bias member decreases the bias against the deformable seal, the deformable seal gradually moves out of the channels, allowing fluid flow through the channels, and through the passage in the flow control.

According to the embodiment, the deformable seal does not need to separate from the seal surface to allow fluid flow. Instead, fluid low initiates through small, controlled flow areas in the channels created when the deformable seal withdraws from the channels. Because the deformable seal does not need to separate from the seal surface in order to allow fluid flow, disturbances ate not created in the fluid flow. Therefore, fluid flow is stable through the flow control.

Other aspects and advantages of the invention will be discussed with reference to the figures and to the detailed description of the preferred embodiments.

BRIEF DESCRIPTION OF THE FIGURES

The invention will be described by way of example, in the description of exemplary embodiments, with particular reference to the accompanying figures in which.

DETAILED DESCRIPTION

Figure 1B:
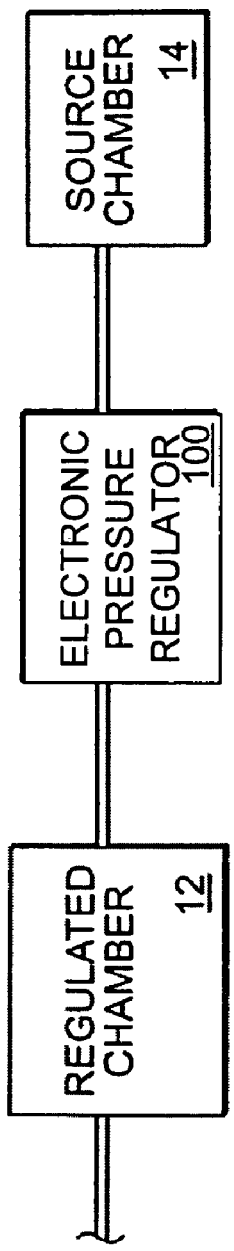
FIG. 1B is a block diagram of an embodiment of an electronically controlled pressure regulator.

While described below for use in a pressure regulator, the variable fluid flow restrictor is applicable to flow controllers, and other valves that regulate gas and liquid pressure and flow. FIG. 1A is a block diagram of an electronically controlled pressure regulator having a variable fluid flow restrictor 10. The variable fluid flow restrictor 10 is in fluid communication with a regulated chamber 12 and a source chamber 14. The variable fluid flow restrictor 10 controls the fluid flow between the regulated chamber 12 and the source chamber 14 by selectively allowing fluid to flow from the source chamber 14 to the regulated chamber 12. The output of the variable fluid flow restrictor 10 is in fluid communication with a pressure sensor 13. The regulated chamber 12 can be connected in fluid communication with a test device, such as the column of a chromatograph (not shown). The pressure in the test device is regulated according to the pressure in the regulated chamber 12. An electronic controller 15 is electronically coupled to the variable fluid flow restrictor 10 and to the pressure sensor 13. The electronic controller 15 receives a signal representative of the output of the variable fluid flow restrictor 10 from the pressure sensor 13 and controls the variable fluid flow restrictor 10 such that the desired pressure in the test device is achieved. Alternatively, the electronic controller 15 can be programmed, or otherwise controlled, to control the operation of the variable fluid flow restrictor 10. The variable fluid flow restrictor 10, electronic controller 15 and pressure sensor 13 comprise an electronic pressure regulator 100.

Figure 1A:
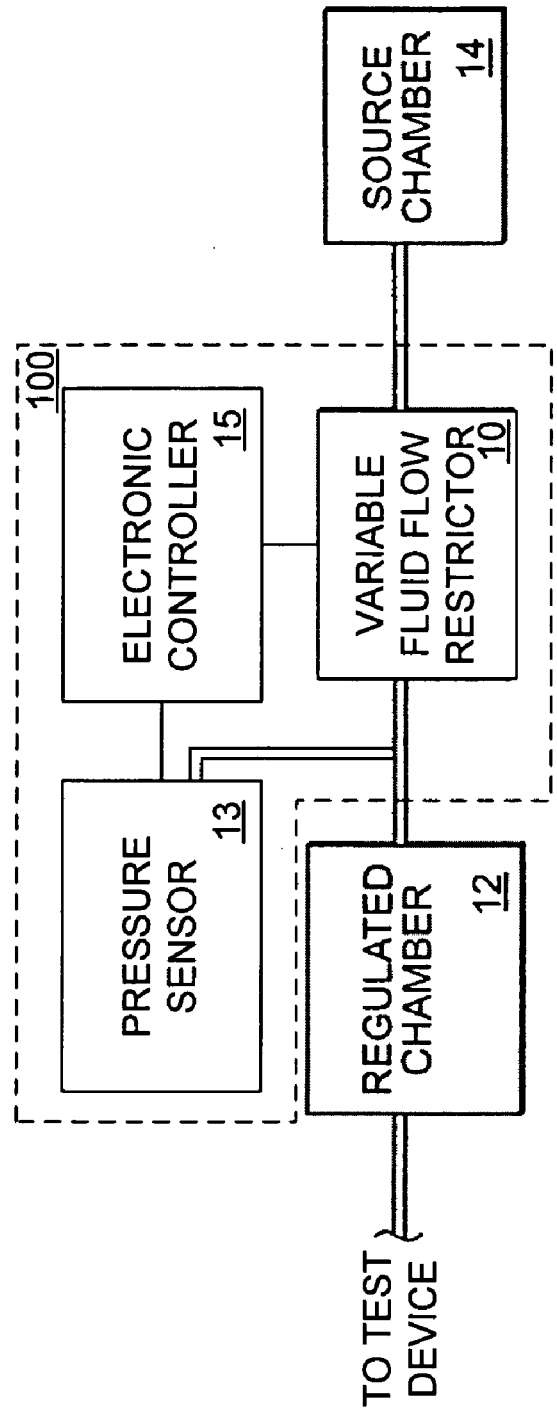
FIG. 1A is a block diagram of an embodiment of an electronically controlled pressure regulator having a variable fluid flow restrictor.

FIG. 1B is a block diagram of an embodiment of an electronic pressure regulator 100. The pressure regulator 100 is in fluid communication with a regulated chamber 12 and a source chamber 14. The pressure regulator 100 regulates the pressure in the regulated chamber 12 by selectively allowing pressurized gas to flow from the source chamber 14 to the regulated chamber 12. The regulated chamber 12 can be connected in fluid communication with a test device, such as the column of a chromatograph (not shown). The pressure in the test device is regulated according to the pressure in the regulated chamber 12.

Figure 2:
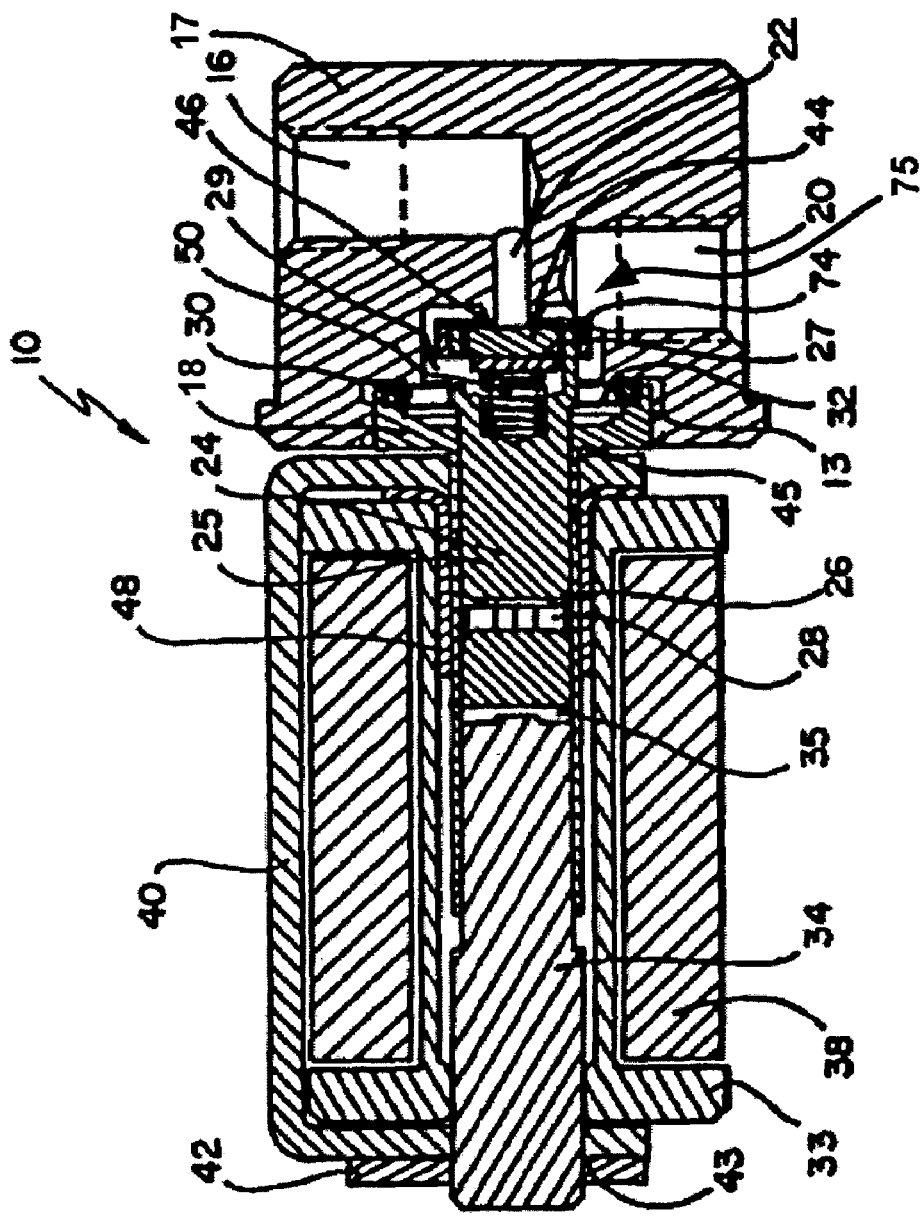
FIG. 2 is a sectional view of an embodiment of a variable fluid flow restrictor having a flow control.

FIG. 2 is a sectional view of an embodiment of a variable fluid flow restrictor 10. In this embodiment, the variable fluid flow restrictor 10 is an electronically controlled, electromechanical device having a cylindrical magnetic coil 38 which surrounds a hollow bobbin 33. A stem assembly 18 and a pole piece 34 are contained within hollow bobbin 33. A yoke 40 is of rectangular cross section, and has two openings 43, 45 which allow the yoke 40 to slip over the stem assembly 18 and pole piece 34. A flat compression C-ring 42 surrounds pole piece 34, and is used to retain yoke 40 to magnetic coil 38 and the bobbin assembly.

A cylindrical metallic armature assembly 24 is contained within the central cavity of the pressure regulator 10 defined by bobbin 33. The armature assembly 24 includes a solenoid plunger portion 25 and a poppet portion 27. An elastomer damper element 28 is mounted on a cylindrical groove 26 of armature assembly 24.

The cylindrical stem assembly 18 has an internal bore to receive the armature assembly 24. A threaded interface 13 attaches the stem assembly 18 to a cylindrical valve body. At the opposite end of the threaded interface, the stem assembly 18 has an elongated cylindrical portion that is coupled to cylindrical pole portion 34. The valve body 17 has inlet ports 16 and outlet ports 20 which allow fluid to enter and exit a centrally located orifice, also referred to as a flow control, 22 of the valve. The inlet port 16 can be coupled to the source chamber 14 and the outlet port 20 can be coupled to the regulated chamber 12.

An elastomer o-ring 30 is contained between the stem assembly 18 and the valve body 17 to prevent external leakage. A flat spring 32 is constrained on its outside diameter between the stem assembly 18 and o-ring 30 and on its inner diameter at the armature assembly 24.

The variable fluid flow restrictor 10 includes a support 75, a coil spring, also referred to as a bias member 50 translatable within the support 75, and a cylindrical spring-loaded deformable elastomer seal 44 biased between a seal surface 46 of the support 75 and the bias member 50.

The cylindrical spring-loaded deformable elastomer seal 44 is located in a cylindrical internal bore in poppet portion 27 of armature assembly 24. The cylindrical spring-loaded deformable elastomer seal 44 is deformable and has a metallic back plate, and is spring-loaded against a seal surface 46 by a coil spring 50. The coil spring 50 acts as a bias member to bias the cylindrical spring-loaded deformable elastomer seal 44 against the seal surface 46. A vent hole 29 occupies approximately ⅕ of the diameter of the poppet portion 27 of the armature assembly 24, and is provided to balance pressure on either side of the poppet portion 27. A cylindrical retaining cap 74 has an internal bore which mates with armature assembly 24 and an internal through-hole which allows the cylindrical spring-loaded deformable elastomer seal 44 to interface with the seal surface 46. As will be described in detail below, the seal surface 46 is not a completely planar surface. Instead, channels in the seal surface 46 are provided to allow stable fluid flow from the inlet ports 16 to the outlet ports 20. The channels are discussed in detail below with reference to FIGS. 6, 7, 8 and 9.

The flat spring 32 and the valve body 17 comprise non-magnetic material, and armature assembly 24, pole 34, and yoke 41 comprise magnetic material. As the magnetic coil 38 is energized, the coil maanetoxnotive force induces a flux through yoke 40 and pole piece 34, across a working aap 35, through armature assembly 24, and back to yoke 40 via flux concentrator 48.

Figure 3:
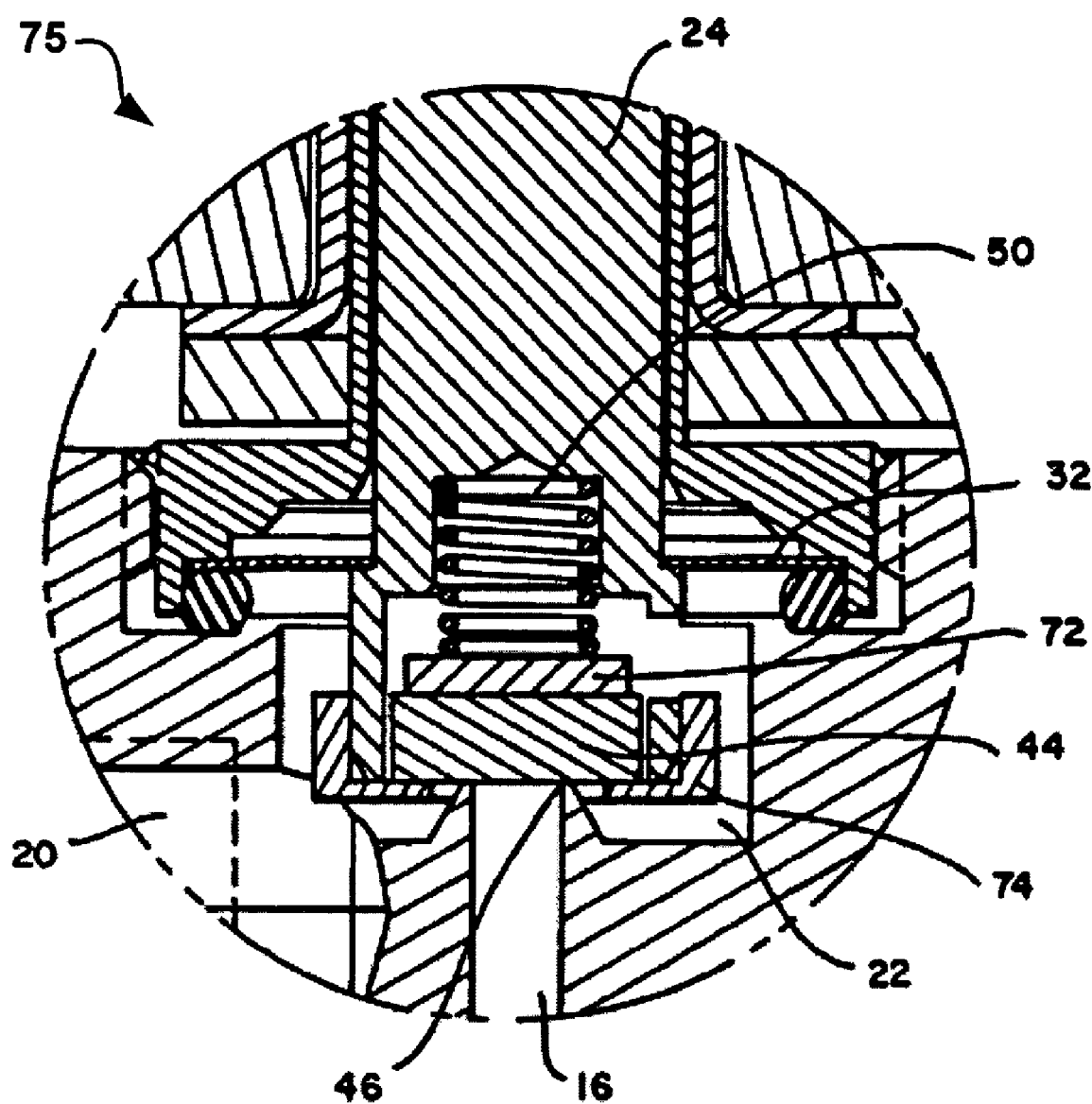
FIG. 3 is a sectional view of an embodiment of a support of the variable fluid flow restrictor illustrated in FIG. 2.

FIG. 3 is a cross-sectional view of a portion of the variable fluid flow restrictor showing the cylindrical spring-loaded deformable elastomer seal 44 and the seal surface 46. The cylindrical spring-loaded deformable elastomer seal 44 is inserted into a longitudinal bore in the armature assembly 24. The cylindrical spring-loaded deformable elastomer seal 44 can be formed from a material having a consistency that allows the seal to deform and fill the channels (not shown in FIG. 3) in the seal surface 46. The cylindrical spring-loaded deformable elastomer seal 44 is attached to a metallic back-up plate 72 and a low spring rate coil spring 50. A cap 74 is pressed onto the armature assembly 24. The entire assembly is thus loaded, compressed and held in place by cap 74. The coil spring 50 has a low spring rate, which allows the coil spring to absorb any growth or shrinkage of the cylindrical spring-loaded deformable elastomer seal 44 without affecting the preload provided by the flat spring. The low rate coil spring 50 maintains the cylindrical spring-loaded deformable elastomer seal 44 in contact with the seal surface 46.

Figure 4:
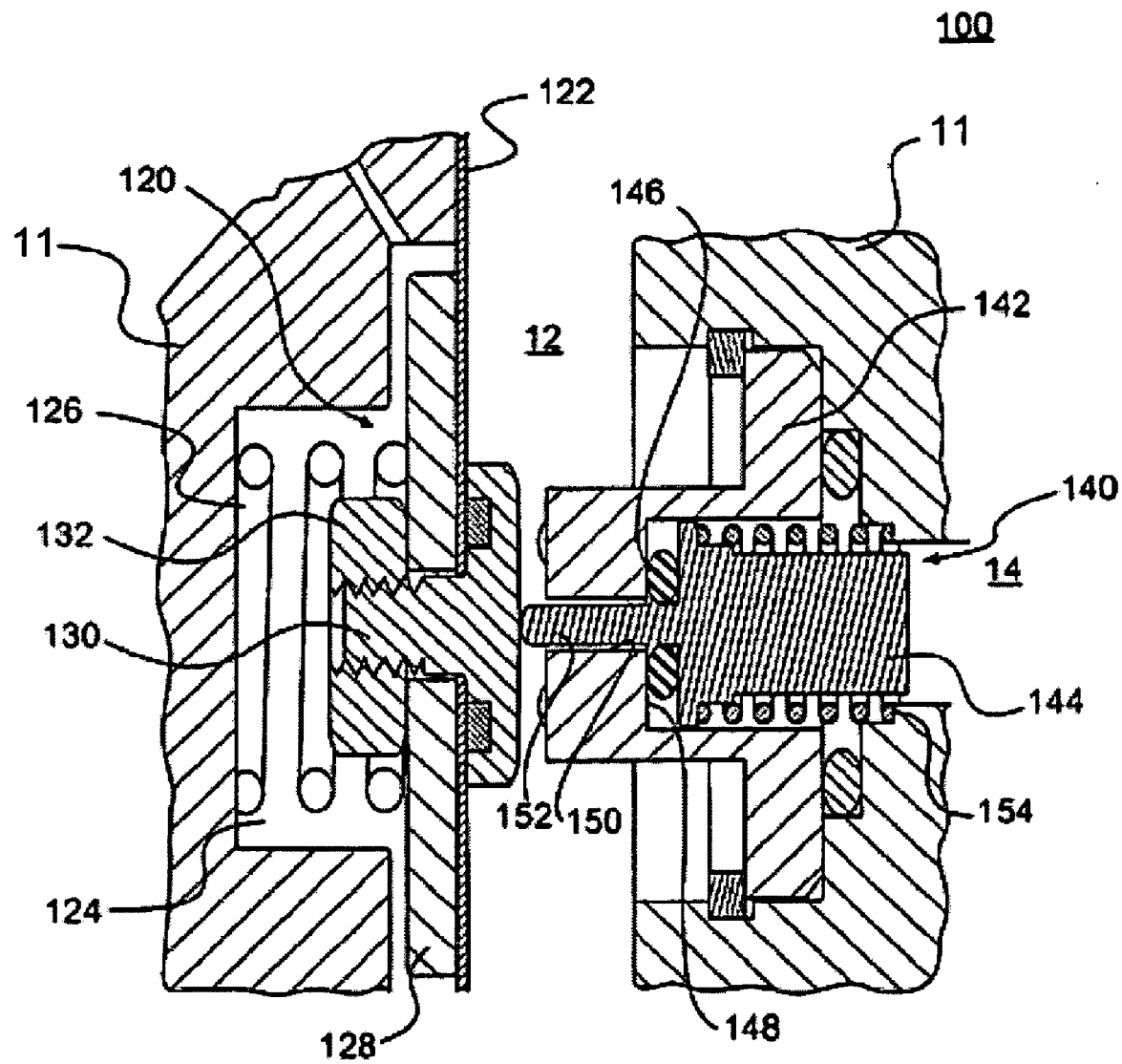
FIG. 4 is a sectional view of an alternative embodiment of a pressure regulator having a flow control.

FIG. 4 is a sectional view of a pressure regulator 100 having a variable fluid flow restrictor. The pressure regulator 100 can be an electro-mechanically actuated device, as shown in FIGS. 2 and 3, a mechanical device, a piezoelectric actuated device, an electrostatic actuated device, an air actuated device, a micro-machined thermally actuated device, a bi-metal actuated device, or can be actuated and controlled using any other methodology. The pressure regulator 100 is mountable within a housing 11. The regulated chamber 12 and the source chamber 14 can also be included within the housing 11. The pressure regulator 100 includes an actuator 120 and a flow control 140. The flow control 140 is responsive to the actuator 120 to selectively allow gas to flow from the source chamber 14 to the regulated chamber 12.

The actuator 120 includes a membrane 122 that seals a bias chamber 124 from the regulated chamber 12. A membrane bias spring 126 exerts a bias against the membrane 122 through a washer 128 connected to the membrane 122. The washer 128 is connected to the membrane 122 by a bolt 130 and a nut 132.

The flow control 140 includes a support 142, a bias member 144 translatable within the support 142, and a deformable seal 146 biased between a seal surface 148 of the support and the bias member 144. In this embodiment, the deformable seal 146 has an o-ring cross section. The bias member 144 applies a variable bias against the deformable seal 146 in response to the actuator 120. The variable bias against the deformable seal 146 allows gas to selectively flow from the source chamber 14, through the flow control 140, and into the regulated chamber 12. The fluid flow path from the source chamber 14 to the regulated chamber 12 is as follows: between the bias member 144 and the support 142; through channels (not illustrated in FIG. 4) in the seal surface 148; and through an annular space between a passage 150 in the support 142 and a projection 152 of the bias member 144. The source chamber 14 should be at a higher pressure than a desired pressure, or "target pressure," for the regulated chamber 12.

According to the embodiment illustrated in FIG. 4, the seal surface 148 of the support 142 is not a completely planar surface. Instead, the channels in the seal surface 148 are provided to allow stable fluid flow through the support 142. The channels in the support 142 are discussed in detail below with reference to FIGS. 6, 7, 8 and 9.

The operation of the pressure regulator 100 will now be discussed with reference to FIG. 4. The force exerted against the left side of the membrane 122 is the pressure in the bias chamber 124 multiplied by the area of the membrane 122, plus the force exerted by the membrane bias spring 126. The pressure in the bias chamber 124 and the spring constant of the membrane bias spring 126 are selected so that the target pressure in the regulated chamber 12 maintains the membrane 122 in an undeflected state. If the pressure in the regulated chamber 12 is lower than the target pressure, the membrane 122 deflects to the right. Deflection of the membrane 122 causes the bolt 130 to push the projection 152 of the bias member 142 to the right, against the bias of a bias spring 154. The movement of the bias member 144 to the right releases part of the bias against the deformable seal 146, allowing gas to flow from the source chamber 14, through the channels in the seal surface 148, and through the passage 150 into the regulated chamber 12. As the pressure rises in the regulated chamber 12, the membrane 122 deflects to the left, and the bias member 144 restores the seal between the deformable seal 146 and the seal surface 148.

Figure 5:
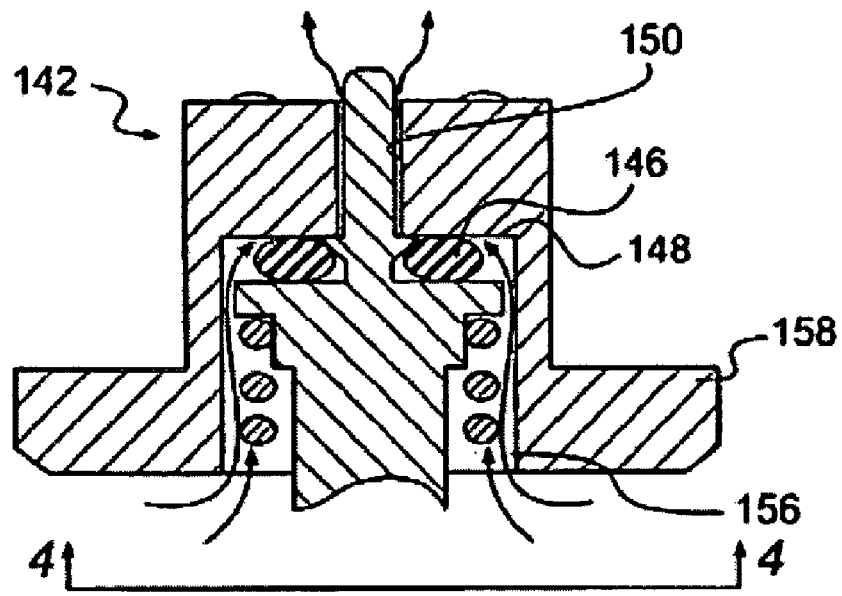
FIG. 5 is a sectional view of an embodiment of a support of the pressure regulator illustrated in FIG. 4.
Figure 6:
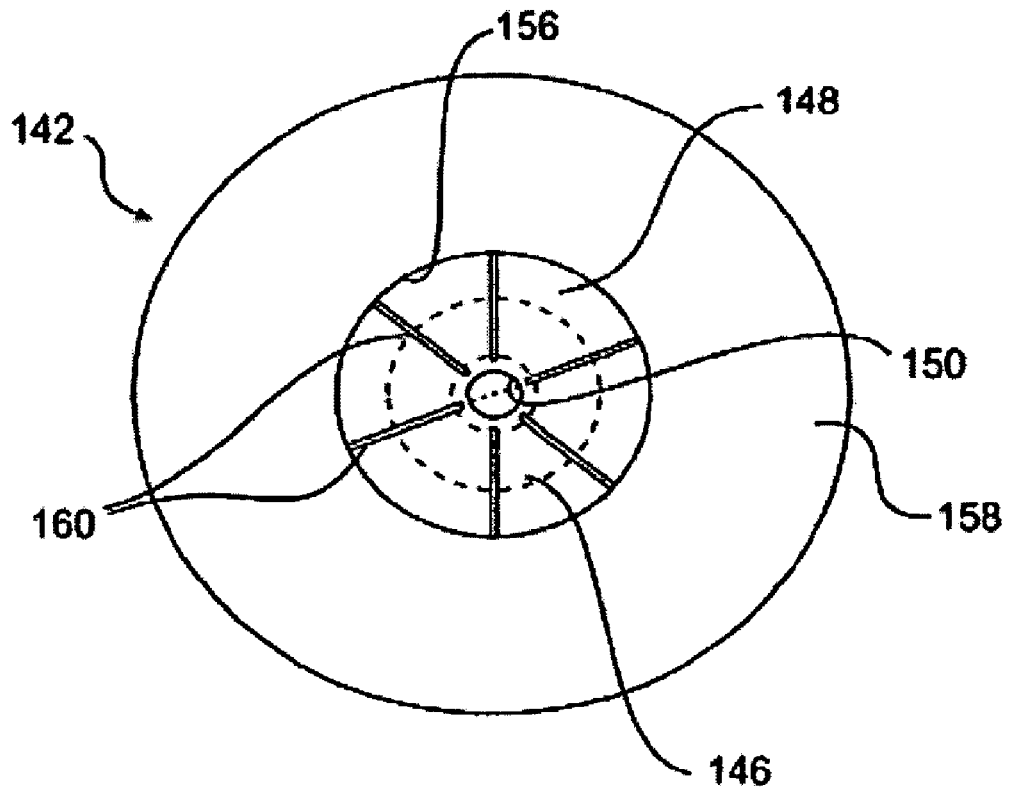
FIG. 6 is a view of the support as seen from the direction of line 4—4 in FIG. 5.

FIG. 5 is a sectional view of an embodiment of the support 142. FIG. 6 is a view of the support 142 as seen from the direction of line 4—4 in FIG. 5. The support 142 includes a cavity 156 for accommodating the bias member 144, and a flange 158 for mounting the support 142. The deformable seal 146 is illustrated as biased against the seal surface 148 of the support 142.

Referring to FIG. 6, the support 142 includes channels 160 formed in the seal surface 148 of FIGS. 4 and 5. Although not shown in FIG. 6, the channels 160 are also formed in the seal surface 46 of FIGS. 2 and 3. The channels 160 are of a depth such that the cylindrical spring-loaded deformable elastomer seal 44 of FIGS. 2 and 3 and the deformable seal 146 of FIGS. 4 and 5 can deform and substantially fill cross sections of the channels 160 when sufficient bias is applied to the cylindrical spring-loaded deformable elastomer seal 44 (FIGS. 2 and 3) and the deformable seal 146 (FIGS. 4 and 5). When the bias against the cylindrical spring-loaded deformable elastomer seal 44 or the deformable seal 146 is decreased, the cylindrical spring-loaded deformable elastomer seal 44 or the deformable seal 146 moves out of the channel 160 before separating from the flat portion of the seal surface 46 (FIG. 3) or the seal surface 148 (FIG. 5). As the cylindrical spring-loaded deformable elastomer seal 44 or the deformable seal 146 withdraws from the channels 160, the gradually increasing flow area through the channels 160 allows for stable fluid flow. When the channels 160 are open, fluid flows through the support 142 as illustrated by the arrows in FIG. 5. The bias member 144 seals the side of the deformable seal 146 opposite to the seal surface 148.

The channels 160 extend radially outward, generally from the passage 150. As illustrated in FIG. 6, the channels 160 need not extend to the opening of the passage 150. The channels 160 only need extend far enough to provide a fluid flow path between the deformable seal 146 (shown in dotted lines in FIG. 6) and the seal surface 148.

Figure 7:
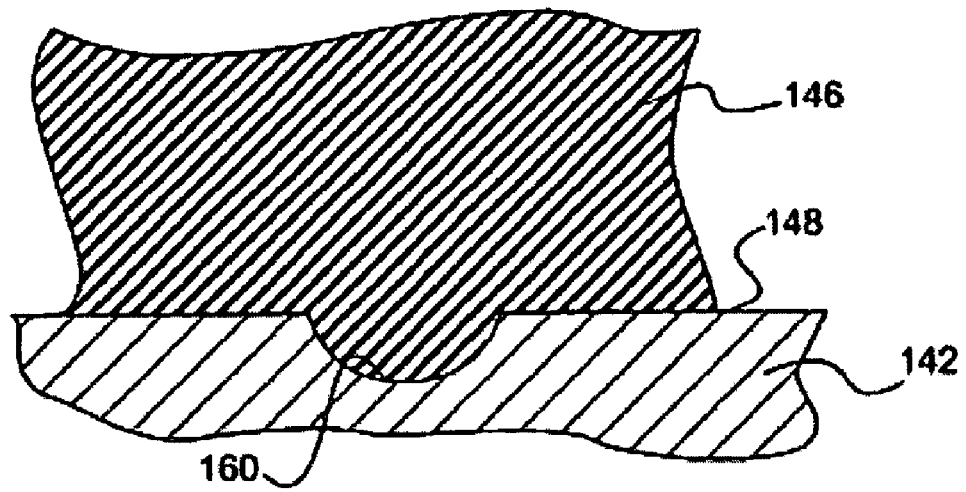
FIG. 7 illustrates a channel cross section with a deformable seal filling the cross section.
Figure 8:
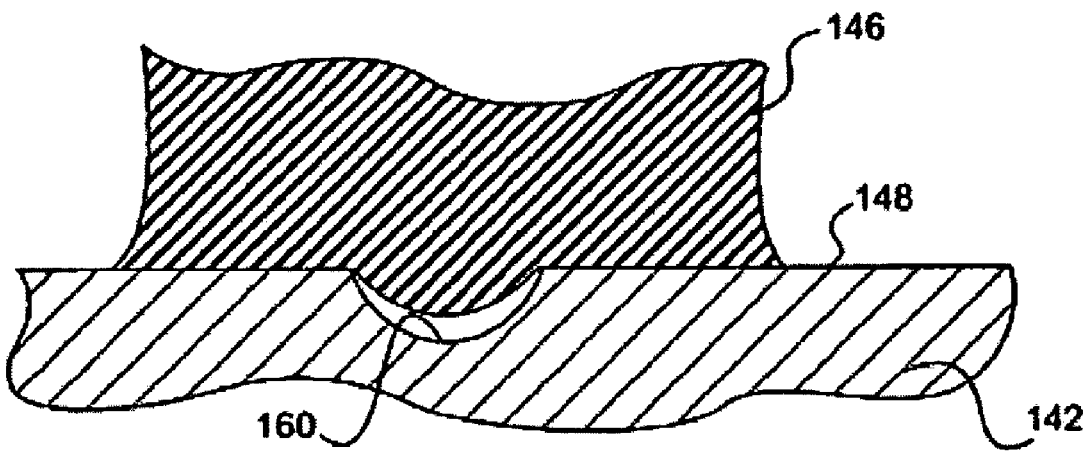
FIG. 8 illustrates a channel cross section with a deformable seal partially filling the cross section.
Figure 9:
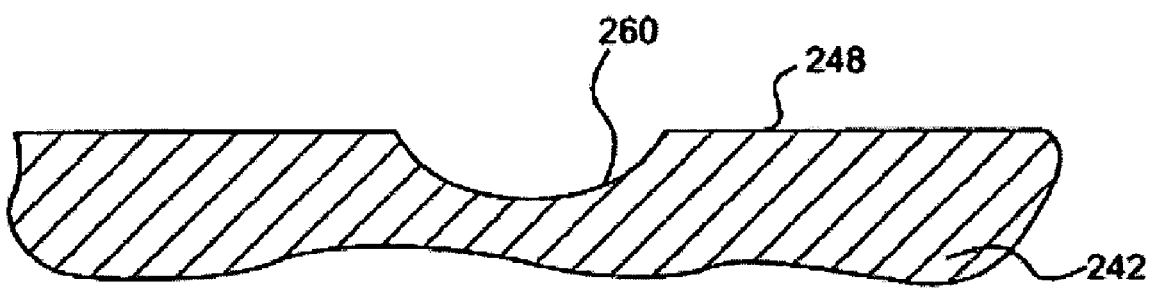
FIG. 9 illustrates an alternative channel cross section.

FIG. 7 illustrates a channel 160 with the deformable seal 146 filling a cross section of the channel 160. FIGS. 7, 8 and 9 are equally applicable to the cylindrical spring-loaded deformable elastomer seal 44 and the seal surface 46 of FIGS. 2 and 3. FIG. 8 illustrates the deformable seal 146 partially withdrawn from the channel 160, allowing fluid flow through the channel 160. As shown in FIG. 8, the deformable seal 146 does not need to separate completely from the remainder of the seal surface 148 to allow fluid flow through the channel 160. The small, controlled flow area created by the withdrawing deformable seal 146 provides for stable flow through the support 142.

The cross sections of the channels 160 illustrated in FIGS. 7 and 8 are generally defined by circular arcs. FIG. 9 illustrates an alternative support 242 having a seal surface 248 with a channel 260 of elliptical cross section. In general, the cross section of the channels is not critical so long as a deformable seal is capable of substantially sealing a cross section of the channels. The width, cross section, depth, and number of the channels can be varied to provide different fluid flows. The channels are not required to extend radially outward in a straight line, and may instead have the shape of an arc or of connected segments. The channels of a support need not have identical cross sections.

The cylindrical spring-loaded deformable elastomer seal 44 illustrated in FIGS. 2 and 3 has the shape of a flat, deformable washer, and the deformable seal 146 illustrated in FIGS. 4–9 has the shape of an o-ring seal. The deformable member 146 may have other forms. The deformable seal should be sufficiently elastic so that at least a portion of it can deform into the channels.

The channels in the seal surface can be formed by, for example, chemical etching, laser engraving, coining, sinking EDM, milling, or manual diamond scribing. Alternatively, the support can be cast or forged with the channels in place. The mating surfaces between the channels and the seal surface can be chamfered or rounded so that the deformable seal more easily fills the channel cross sections.

The foregoing detailed description has been given for understanding exemplary implementations of the invention only and no unnecessary limitations should be understood therefrom as modifications will be obvious to those skilled in the art without departing from the scope of the appended claims and their equivalents.

We claim:

1. An electro-mechanical variable fluid flow restrictor, comprising:

an electronic controller operatively coupled to the variable fluid flow restrictor;

a pressure sensor coupled to the electronic controller;

an electronically controlled electro-mechanical actuator operatively coupled to the variable fluid flow restrictor and responsive to the electronic controller;

the variable fluid flow restrictor further comprising a support having a passage and a seal surface, the seal surface having at least one channel;

a deformable seal engageable with the seal surface and with the at least one channel; and a bias member capable of exerting an electronically controlled variable bias against the deformable seal, wherein when the variable fluid flow restrictor opens, the deformable seal at least partially disengages the at least one channel prior to disengaging from the seal surface enabling fluid to flow through the at least one channel and through the passage, thus making the restrictor a closed-loop electronically controlled variable fluid flow restrictor.

2. The electro-mechanical variable fluid flow restrictor of claim 1, wherein the deformable seal is capable of deformation such that the deformable seal substantially fills a cross section of the at least one channel, substantially blocking fluid flow through the at least one channel.

3. The electro-mechanical variable fluid flow restrictor of claim 2, wherein the bias member is translatable within activity of the support to exert the variable bias against the deformable seal.

4. The electro-mechanical variable fluid flow restrictor of claim 1, wherein the bias member can decrease the bias against the deformable seal so that the deformable seal moves at least partially out of the at least one channel, allowing fluid flow through the at least one channel and through the passage.

5. The electro-mechanical variable fluid flow restrictor of claim 1, wherein the passage extends through the support to the seal surface, and the at least one channel extends outward from the passage.

6. The electro-mechanical variable fluid flow restrictor of claim 1, wherein the at least one channel comprises a plurality of channels extending radially outward from the passage.

7. The electro-mechanical variable fluid flow restrictor of claim 3, wherein the electro-mechanical variable fluid flow restrictor is implemented in a pressure regulator.

8. The electro-mechanical variable fluid flow restrictor of claim 3, wherein the electro-mechanical variable fluid flow restrictor is implemented in a flow controller.

9. The electro-mechanical variable fluid flow restrictor of claim 3, wherein the electro-mechanical variable fluid flow restrictor is implemented in a proportional valve.

10. The electro-mechanical variable fluid flow restrictor of claim 3, wherein the electro-mechanical variable fluid flow restrictor is implemented in a mass flow controller.

11. An electro-mechanical variable fluid flow restrictor, comprising:
an electronic controller operatively coupled to the variable fluid flow restrictor;
a pressure sensor coupled to the electronic controller;
an electronically controlled electro-mechanical actuator operatively coupled to the variable fluid flow restrictor and responsive to the electronic controller;
the variable fluid flow restrictor further comprising a support having a passage and a seal surface, the seal surface having at least one channel;
a deformable seal engageable with the seal surface and with the at least one channel; and
a bias member capable of exerting an electronically controlled variable bias against the deformable seal, wherein the deformable seal is capable of deformation such that the deformable seal substantially fills a cross section of the at least one channel, substantially blocking fluid flow through the at least one channel, wherein the bias member is translatable within a cavity of the support to exert the variable bias against the deformable seal, wherein the bias member can decrease the bias against the deformable seal so that the deformable seal moves at least partially out of the at least one channel prior to disengaging from the seal surface, allowing fluid flow through the at least one channel and through the passage, wherein the passage extends through the support to the seal surface, and the at least one channel extends outward from the passage, wherein the at least one channel comprises a plurality of channels extending radially outward from the passage, thus making the restrictor a closed-loop electronically controlled variable fluid flow restrictor.

12. An electro-mechanical pressure regulator, comprising:
an electronic controller;
a pressure sensor coupled to the electronic controller;
an electronically controlled electro-mechanical actuator responsive to the electronic controller; and
a flow control responsive to the actuator, the flow control comprising:
a support having a passage and a seal surface, the seal surface comprising a plurality of channels extending radially outward from the passage
a deformable seal engageable with the seal surface and with the channels; and
a bias member, wherein the bias member exerts a bias against the deformable seal, wherein the deformable seal is capable of deformation such that the deformable seal substantially fills a cross section of the channels, substantially blocking fluid flow through the channels, wherein the bias member exerts a variable bias against the deformable seal in response to the actuator, wherein the bias member can decrease a bias against the deformable seal so that the deformable seal moves at least partially out of the channels prior to disengaging from the seal surface, allowing fluid flow through the channels and through the passage, and wherein the passage extends through the support to the seal surface, thus making the pressure regulator a closed-loop electronically controlled pressure regulator.

13. The electro-mechanical pressure regulator of claim 12, wherein the deformable seal is a cylindrical deformable elastomer seal.

14. The electro-mechanical pressure regulator of claim 12, wherein the deformable seal is an o-ring.

15. The electro-mechanical pressure regulator of claim 12, wherein the bias member is at least partially disposed in a cavity of the support, and includes a projection that is translatable within the passage, the bias member being translatable within the cavity to exert the variable bias against the deformable seal.

16. The electro-mechanical pressure regulator of claim 12, wherein the electro-mechanical pressure regulator is implemented in a pressure regulator.

17. The electro-mechanical pressure regulator of claim 12, wherein the electra-mechanical pressure regulator is implemented in a flow controller.

18. The electro-mechanical pressure regulator of claim 12, wherein the electro-mechanical pressure regulator is implemented in a proportional valve.

19. The electro-mechanical pressure regulator of claim 12, wherein the electro-mechanical pressure regulator is implemented in a mass flow controller.

20. An electro-mechanical variable pressure regulator, comprising:
an electronic controller;
a pressure sensor coupled to the electronic controller;
an electronically controlled electro-mechanical actuator responsive to the electronic controller; and
a flow control responsive to the actuator, the flow control comprising:

a support having a passage and a seal surface, the seal surface comprising a plurality of channels extending radially outward from the passage;

a deformable seal engageable with the seal surface and with the channels; and a bias member, wherein the bias member exerts a bias against the deformable seal, wherein the deformable seal is capable of deformation such that the deformable seal substantially fills a cross section of the channels, substantially blocking fluid flow through the channels, and wherein the passage extends through the support to the seal surface, thus making the pressure regulator a closed-loop electronically controlled pressure regulator.

* * * * *

UNITED STATES PATENT AND TRADEMARK OFFICE
CERTIFICATE OF CORRECTION

| | | |
|---|---|---|
| PATENT NO. | : 7,128,089 B2 | Page 1 of 1 |
| APPLICATION NO. | : 10/845947 | |
| DATED | : October 31, 2006 | |
| INVENTOR(S) | : Bente et al. | |

It is certified that error appears in the above-identified patent and that said Letters Patent is hereby corrected as shown below:

In column 7, line 3, in Claim 1, after "surface" insert -- , --.

In column 7, line 14, in Claim 3, delete "activity" and insert -- a cavity --, therefor.

In column 8, line 18, in Claim 12, after "passage" insert -- ; --.

In column 8, line 52, in Claim 17, delete "electra" and insert -- electro --, therefor.

Signed and Sealed this

Thirteenth Day of March, 2007

JON W. DUDAS
*Director of the United States Patent and Trademark Office*